US011927247B2

(12) United States Patent
Wheeler et al.

(10) Patent No.: US 11,927,247 B2
(45) Date of Patent: Mar. 12, 2024

(54) CLAMP, SYSTEM AND METHOD FOR MEASURING TENSION IN A CONVEYOR BELT

(71) Applicants: THE UNIVERSITY OF NEWCASTLE, Callaghan (AU); TS GLOBAL PTY LIMITED, Mayfield West (AU)

(72) Inventors: Craig Anthony Wheeler, Callaghan (AU); Jason Tom Willis, Callaghan (AU); Dusan Ilic, Callaghan (AU); Graham Dean Holford, Mayfield West (AU)

(73) Assignees: THE UNIVERSITY OF NEWCASTLE, Callaghan (AU); TS GLOBAL PTY LIMITED, New South Wales (AU)

( * ) Notice: Subject to any disclaimer, the term of this patent is extended or adjusted under 35 U.S.C. 154(b) by 0 days.

(21) Appl. No.: 17/605,865

(22) PCT Filed: Apr. 24, 2020

(86) PCT No.: PCT/AU2020/050397
§ 371 (c)(1),
(2) Date: Oct. 22, 2021

(87) PCT Pub. No.: WO2020/215126
PCT Pub. Date: Oct. 29, 2020

(65) Prior Publication Data
US 2022/0221028 A1    Jul. 14, 2022

(30) Foreign Application Priority Data

Apr. 26, 2019   (AU) .................... 2019901411

(51) Int. Cl.
*F16G 3/00*        (2006.01)
*B25B 5/02*        (2006.01)
(Continued)

(52) U.S. Cl.
CPC ................ *F16G 3/003* (2013.01); *B25B 5/02* (2013.01); *B25B 5/12* (2013.01); *F16G 3/07* (2013.01);
(Continued)

(58) Field of Classification Search
None
See application file for complete search history.

(56) References Cited

FOREIGN PATENT DOCUMENTS

GB         675572 A  *  7/1952  ............. F16G 3/006
GB        2265468 A  *  9/1993  ............. G01L 5/047

OTHER PUBLICATIONS

International Search Report and Written Opinion of PCT/AU2020/050397 dated Jun. 4, 2020, 10 pages.

* cited by examiner

*Primary Examiner* — William R Harp
(74) *Attorney, Agent, or Firm* — RANKIN, HILL & CLARK LLP

(57) ABSTRACT

In an aspect there is disclosed examples of a clamp (10, 110) for measuring a tension of a conveyor belt (12). The clamp (10, 110) including a clamping portion (18, 118) arranged to engage with opposing faces of the conveyor belt (12) in a clamped condition to hold the conveyor belt (12) relative to an anchor, and a load sensing arrangement (22, 122) associated with the clamping portion (18, 118) configured to provide a signal indicative of the tension in the conveyor belt (12) in the clamped condition. A system and related method are also disclosed.

22 Claims, 11 Drawing Sheets

(51) Int. Cl.
    *B25B 5/12*        (2006.01)
    *F16G 3/07*        (2006.01)
    *F16G 3/08*        (2006.01)
    *G01L 5/102*       (2020.01)
    *G01L 5/108*       (2020.01)
(52) U.S. Cl.
    CPC ............... *F16G 3/08* (2013.01); *G01L 5/102*
                    (2013.01); *G01L 5/108* (2013.01); *B65G*
                    *2203/0266* (2013.01); *B65G 2203/042*
                    (2013.01); *B65G 2812/02108* (2013.01)

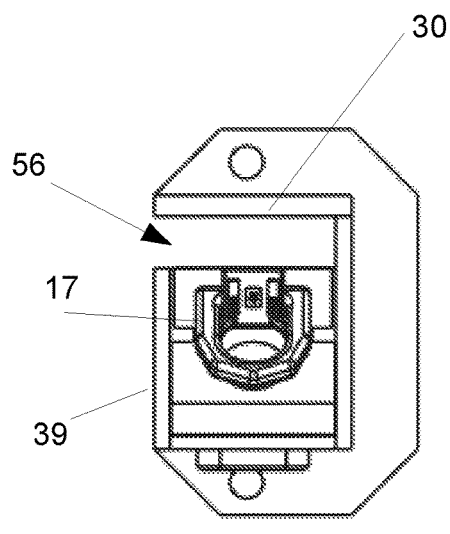
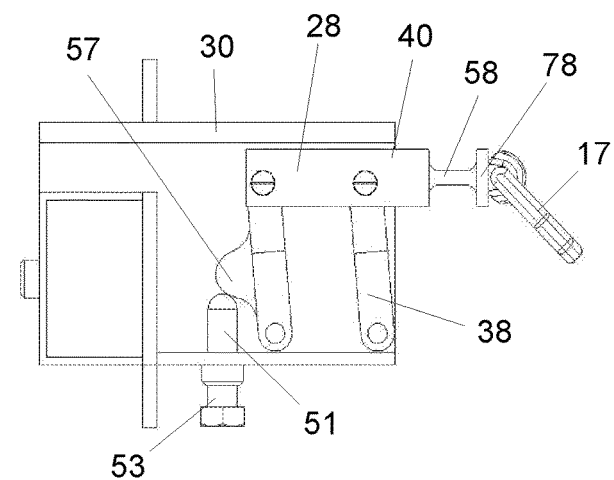
Figure 5
Figure 6
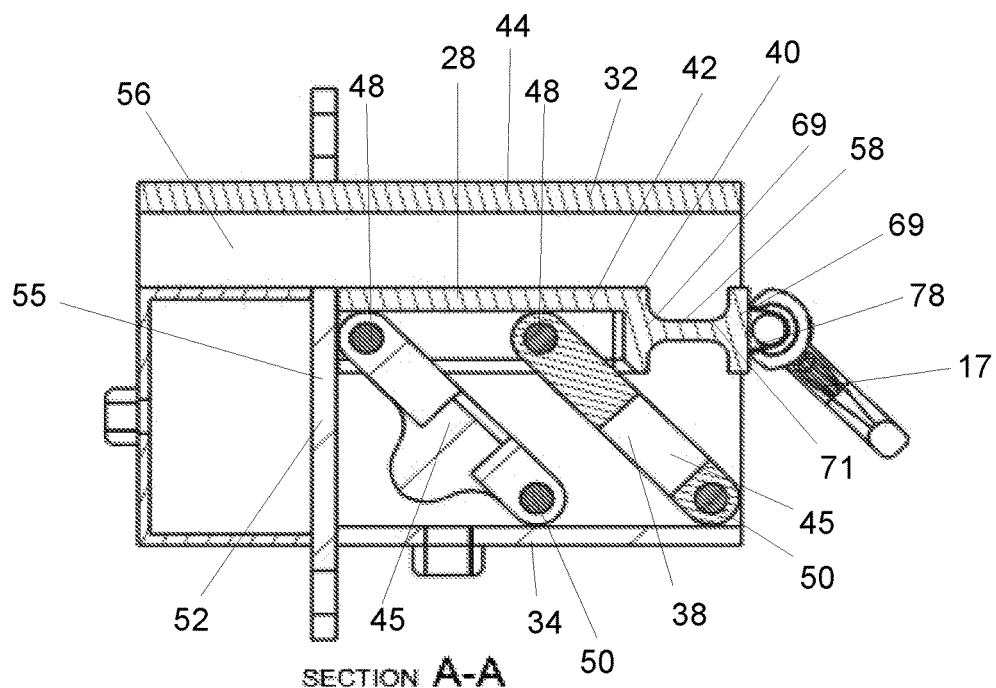
Figure 7

CLAMP, SYSTEM AND METHOD FOR MEASURING TENSION IN A CONVEYOR BELT

TECHNICAL FIELD

This application claims priority from Australian provisional patent application no. 2019901411 filed on 26 Apr. 2019, the contents of which are incorporated by reference.

TECHNICAL FIELD

The invention relates to a clamp for a conveyor belt. In particular, the invention relates to a clamp, a system and associated method for measuring tension in a conveyor belt.

BACKGROUND

Conveyor systems often require maintenance such as if the conveyor belt becomes damaged or to change rollers of the conveyor system. During such maintenance, the belt may need to be held so that tension can be removed from damaged sections to, for example, allow a new section of belt to be spliced with the existing belt or allow a roller to be replaced. Accordingly, many types of belt clamps have been developed that hold the belt to allow such maintenance to take place.

One example of a belt clamp includes two flat bars arranged to each transverse the belt and engage with opposing side faces of the belt, and clamps at opposing ends of the flat bars. Once the two flat bars are in position, the clamps are tightened to compress the flat bars toward one another and thereby secure the belt. More than one belt clamp may be used such as to isolate a section of the belt to be repaired.

A problem with such belt clamps is that the clamps are designed with a load rating relating to the inline tension of the belt. However, it is difficult to determine, and often unknown, what actual tension is being applied to the belt or the load on the clamps, in use. Accordingly, the belt clamps may unexpectedly fail due to over loading, or the high tension within the belt may damage the belt or other parts of the conveyor system.

The invention disclosed herein seeks to overcome one or more of the above identified problems or at least provide a useful alternative.

SUMMARY

In accordance with a first broad aspect there is provided, a clamp for measuring a tension of a conveyor belt, the clamp including a clamping portion arranged to engage with opposing faces of the conveyor belt in a clamped condition to hold the conveyor belt relative to an anchor, and a load sensing arrangement between the clamping portion and the anchor, the load sensing arrangement configured to provide a signal indicative of the tension in the conveyor belt in the clamped condition.

In an aspect, the load sensing arrangement includes at least one load sensor arranged to measure at least a load applied in a direction inline with the belt.

In another aspect, the clamping portion includes a first clamping section and a second clamping section arranged to each engage with the opposing faces of the conveyor belt in the clamped condition.

In yet another aspect, the first clamping section is movable relative to the second clamping section to engage with the conveyor belt in the clamped condition.

In yet another aspect, the load sensing arrangement is connected to the first clamping section so as to be movable therewith.

In yet another aspect, the load sensing arrangement includes a load sensing section between the first clamping section and the anchor, and wherein the load sensing section carries the at least one load sensor.

In yet another aspect, the load sensing section has a substantially dog-bone shape.

In yet another aspect, the load sensing section is located between the first clamping section and the anchor, and wherein the load sensing section carries the at least one load sensor.

In yet another aspect, the at least one load sensor is provided in the form of two strain gauges each located proximate respective opposing upper and lower surfaces of the load sensing section.

In yet another aspect, a free end of the load sensing section is coupled with an anchor point that is in turn coupled with the anchor in the clamped condition.

In yet another aspect, the second clamping section is substantially fixed.

In yet another aspect, the clamp includes a main body with a top and a bottom, the second clamping section being provided toward the top and the first clamping section being pivotally supported by a pivotal coupling arranged between the bottom and the first clamping section.

In yet another aspect, the pivotal coupling is arranged to maintain a first clamping surface of the first clamping section substantially parallel to the conveyor belt.

In yet another aspect, the pivotal coupling is arranged to allow the first clamping section to increase a clamping force on the belt in response to an increase in tension within the conveyor belt.

In yet another aspect, the pivotal coupling includes two parallel members pivotally coupled at spaced apart locations between the bottom and the first clamping section.

In yet another aspect, the main body includes opposing sides between the top and the bottom, one of the opposing sides having a slot in which an edge of the conveyor belt is receivable.

In yet another aspect, the clamp includes a retainer arranged to maintain the clamp in the clamped condition.

In yet another aspect, the load sensing arrangement includes a communication device arranged to communicate a signal indicative of the tension to an external device.

In accordance with a second broad aspect there is provided, pair of clamps adapted to couple with opposing side edges of a conveyor belt, each one of the pair clamps formed in accordance with one or more aspects of the clamp described above and herein.

In accordance with a third broad aspect there is provided, a system for detecting load in a conveyor belt. The system including: a pair of clamps each having respective clamping portions adapted to clampingly engage with opposing side edges of the conveyor belt in a clamped condition; an anchoring arrangement arranged to couple with an anchor point of the pair of clamps to anchor the pair of clamps to a fixed structure; a load sensing arrangement including a load sensing section located between at least one of the respective clamping portions of the pair of clamps and the anchoring arrangement, each load sensing section including a load sensor and a communication device arranged to communicate a load signal; and a receiving device configured to receive the load signal so as to provide an indication of a tension in the conveyor belt in the clamped condition.

In accordance with a fourth broad aspect there is provided, a method for detecting load in a conveyor belt, the method including the steps of: fitting a pair of clamps to opposing edges of the conveyor belt and moving at least one of the respective clamping portions of the pair of clamps to engage with opposing side edges of the conveyor belt in a clamped condition; coupling an anchoring arrangement to a load sensing section associated with one or both of the clamping portions of each pair of clamps; transmitting, via a communication device associated with load sensors fitted to each load sensing section, a load signal; and receiving, at a receiving device, the load signal so as to provide an indication of a tension in the conveyor belt in the clamped condition.

In an aspect, the method further includes: determining a measured belt tension based on the load signal; and comparing the measured belt tension with a predetermined threshold belt tension; and providing an alert if the measured belt tension exceeds the predetermined threshold belt tension.

In accordance with a fifth broad aspect there is provided, a clamp for measuring tension of a conveyor belt, the clamp including a clamping arrangement adapted to engage with opposing faces of the conveyor belt in a clamped condition to hold the conveyor belt relative to an fixed anchor, and a load sensing arrangement associated with the clamping arrangement configured to provide a signal indicative of the tension in the conveyor belt in the clamped condition.

In accordance with a sixth broad aspect there is provided, a clamp for measuring a tension of a conveyor belt, the clamp including a clamping part arranged to engage with at least one opposing face of the conveyor belt in a clamped condition to hold the conveyor belt relative to an anchor, and a load sensor operatively arranged between the clamping part and an anchor point connectable to the anchor, the load sensor being configured to provide a signal indicative of the tension in the conveyor belt in the clamped condition.

In accordance with a seventh broad aspect there is provided, a system for measuring a tension of a conveyor belt, the system including: a clamp including a clamping part arranged to engage with at least one opposing face of the conveyor belt in a clamped condition to hold the conveyor belt relative to an anchor, a load sensor operatively associated between the clamping part and an anchor point connectable to the anchor so as to provide a signal indicative of the tension of the conveyor belt in the clamped condition; and a device adapted to receive the signal, and at least one of display a measured tension value and provide an alert if the measured tension value exceeds a predetermined value.

BRIEF DESCRIPTION OF THE FIGURES

The invention is described, by way of non-limiting example only, by reference to the accompanying figures, in which;

FIG. 5 is a front view illustrating one of the pair of clamps;

FIG. 6 is a side view illustrating one of the pair of clamps with a side wall removed to reveal the clamping portion moved toward a clamped condition with a retaining mechanism fitted to limit movement of the clamping portion;

FIG. 7 is a side sectional view illustrating one of the pair of clamps along section A-A as shown in FIG. 3;

DETAILED DESCRIPTION

Figure 1:
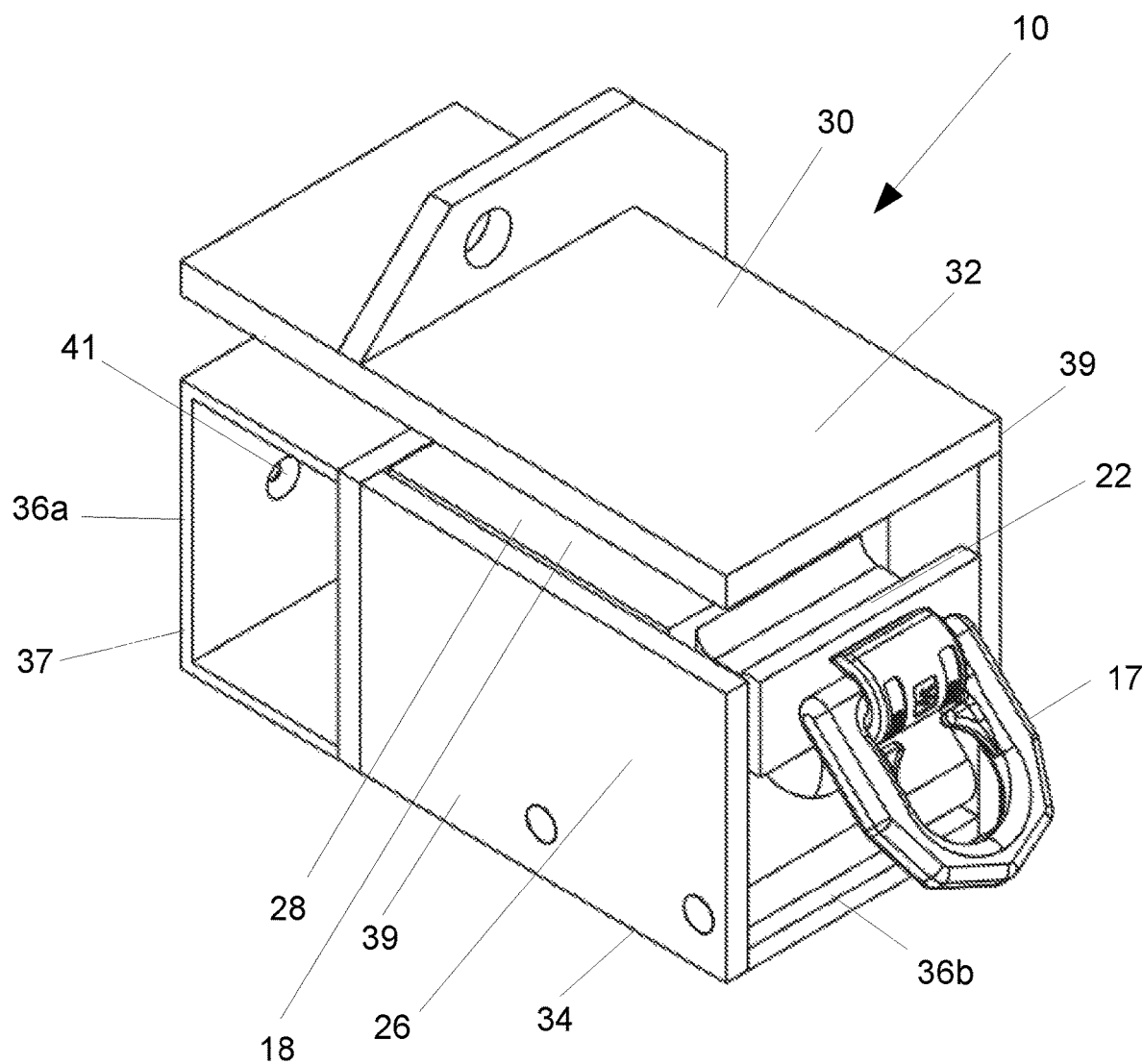
FIG. 1 is a perspective view illustrating a first example one of a pair of clamps for a conveyor belt.
Figure 2:
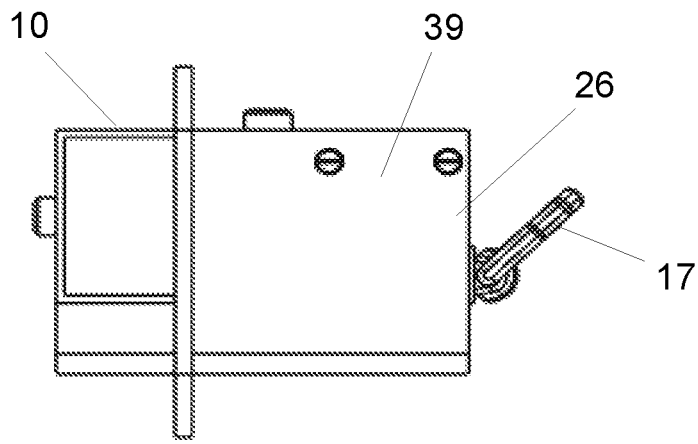
FIG. 2 is a side view illustrating one of the pair of clamps.
Figure 3:
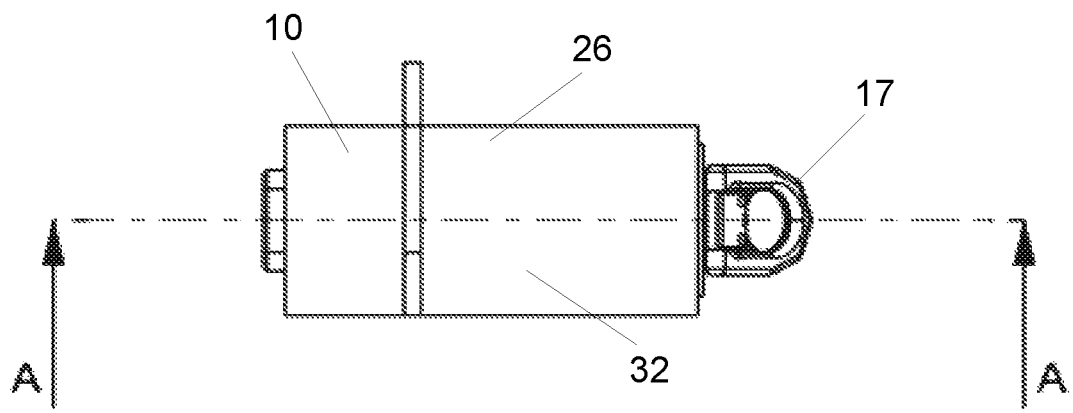
FIG. 3 is a top view illustrating one of the pair of clamps.
Figure 4:
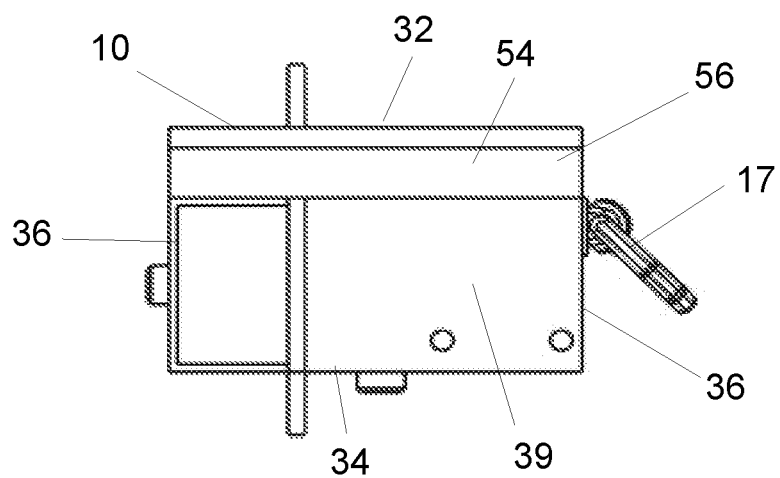
FIG. 4 is an opposing side view illustrating one of the pair of clamps.
Figure 8:
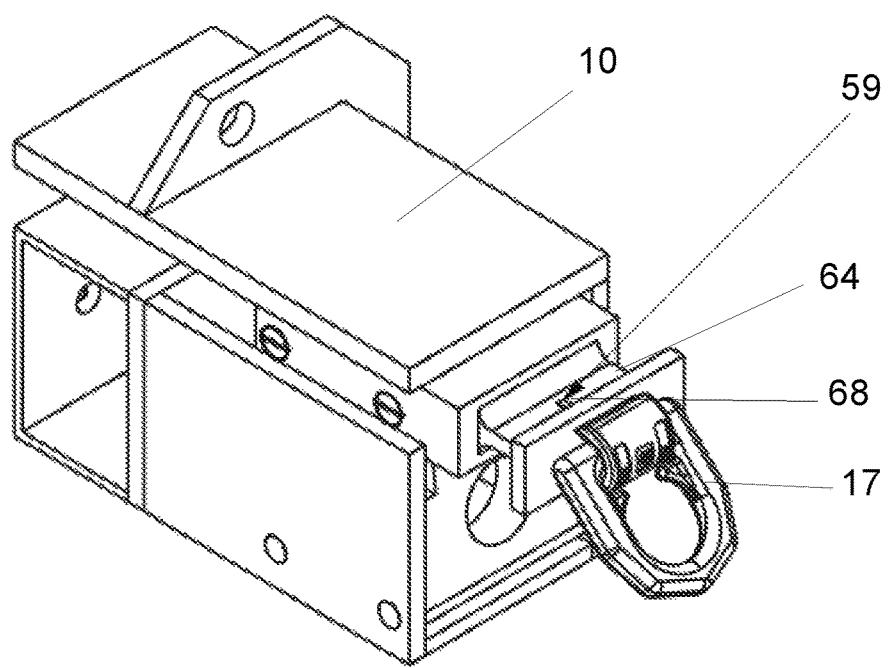
FIG. 8 is another perspective view illustrating one of the pair of clamps showing the position of a load sensor.
Figure 9:
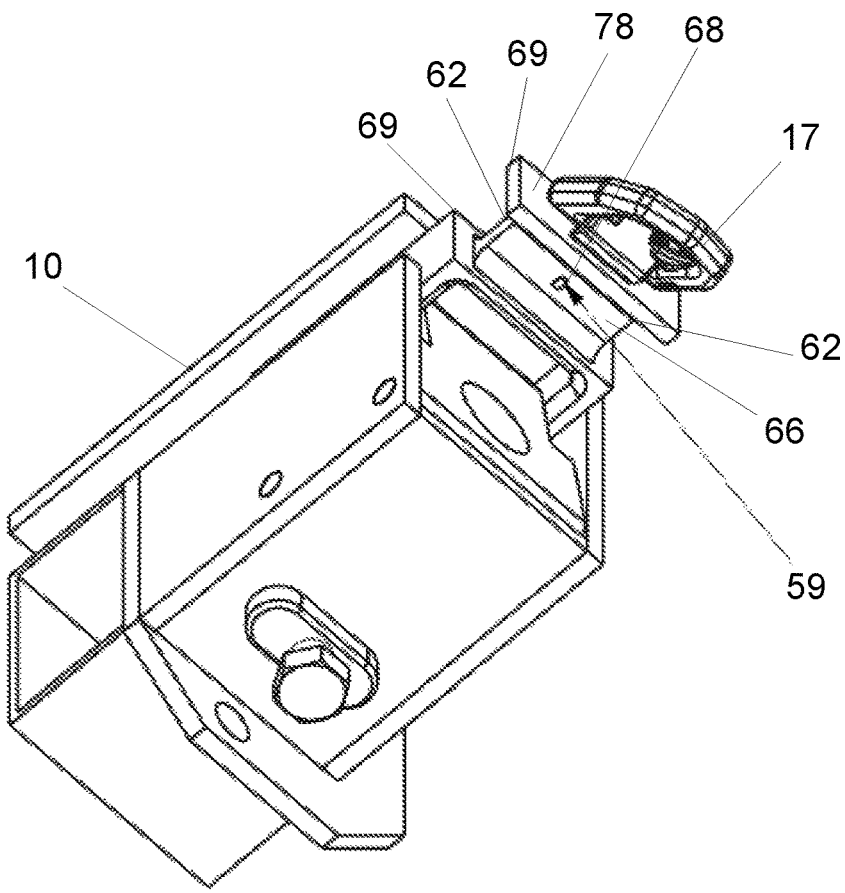
FIG. 9 is an underside perspective view illustrating one of the pair of clamps showing the position of another load sensor.
Figure 10:
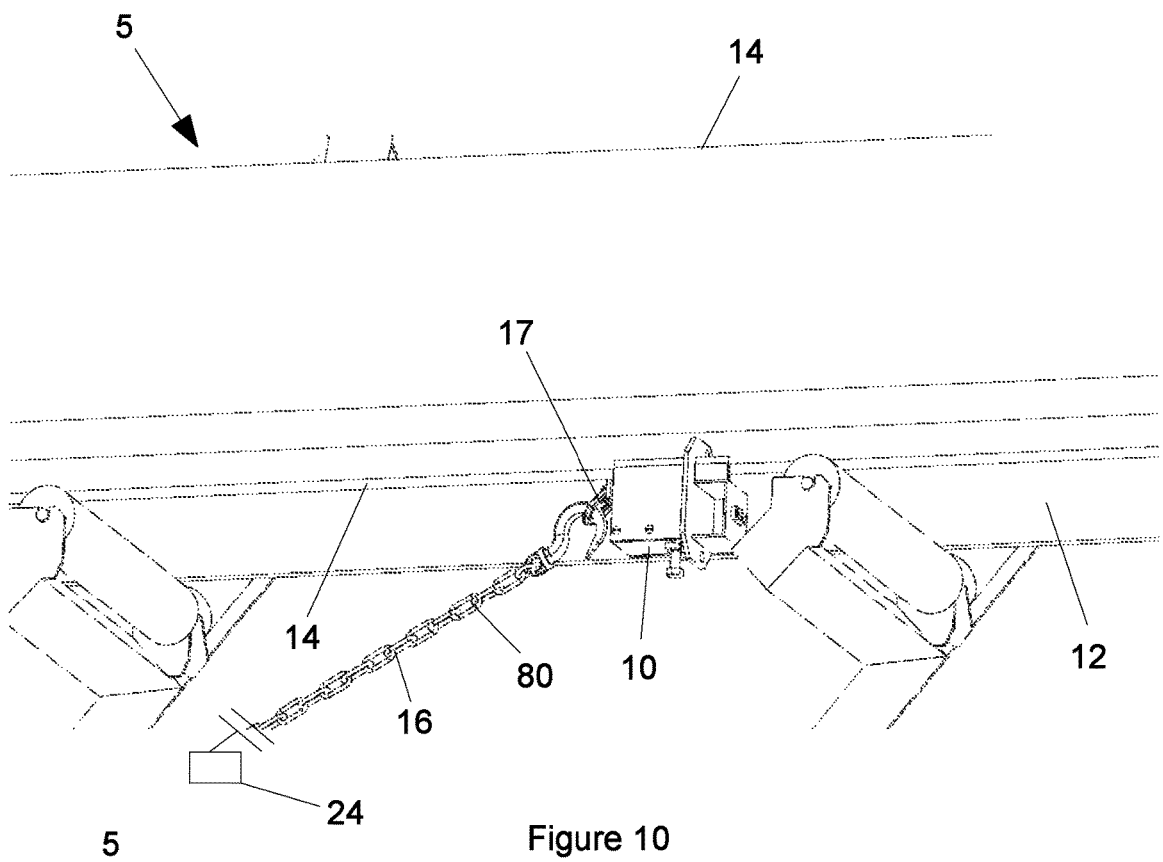
FIG. 10 is a perspective view illustrating a conveyor belt fitted with a system including a clamp fitted to an edge of the conveyer belt and an anchoring arrangement to secure the clamp to a fixed structure.
Figure 11:
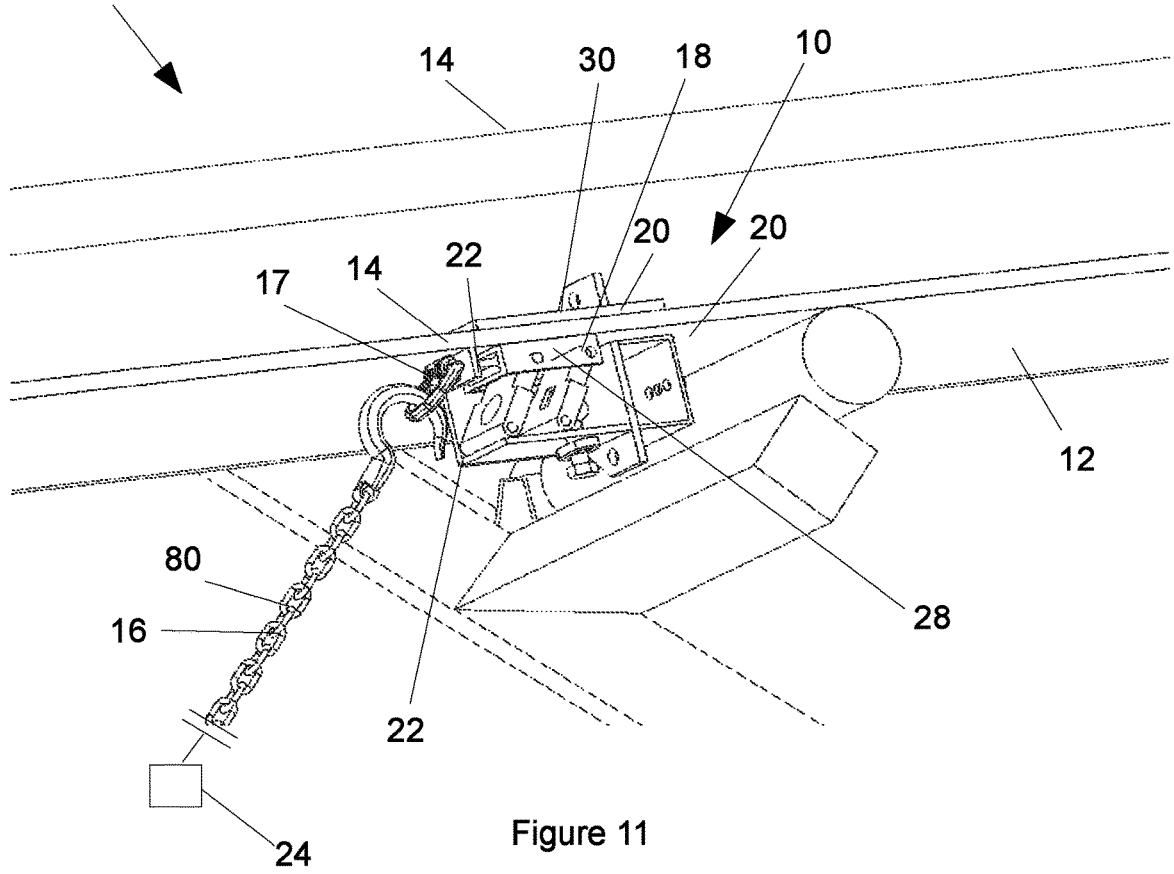
FIG. 11 is another perspective view illustrating the conveyor belt fitted with a system including the clamp, with a side of one of the clamp removed to reveal the internal clamping portions engaged with the conveyor belt.

Referring to FIGS. 1 to 12, there is shown a first example of a clamp 10 for coupling with a conveyor belt 12 to determine or measure a tension of the conveyor belt 12. The clamp 10 may be provided as part of a system 5 that includes pairs of left-hand and right-hand clamps 10 adapted to couple with opposing edges 14 of the conveyor belt 12 and an anchoring arrangement 16 to couple the pairs of left-hand and right-hand clamps 10 to an anchor 12 that may be a fixed structure such as an anchor block or a frame. The anchoring arrangement 16 may be referred to as a "chain-block". The system 5 may further include a load sensing arrangement 22 associated with the clamp 10 that may be in communication with a remote device 74 (shown in FIG. 12) that may be used to, for example, display the tension present in the conveyor belt 12.

Each clamp 10 includes a clamping portion or arrangement 18 arranged to engage with opposing faces 20 of the conveyor belt 12 in a clamped condition, and in this example of the load sensing arrangement 22 is operative between the clamping portion 18 and an anchor 24 of the anchoring arrangement 16. The load sensing arrangement 22 is configured to provide an indication of a tension in the conveyor belt 12 in the clamped condition as is further detailed below. It is noted that in the clamped condition the conveyor belt 12 is typically stationery.

Turning to the clamp 10 configuration in more detail, as best shown in FIGS. 1 to 7, the clamp 10, more specifically the clamping portion or arrangement 18, thereof includes a first clamping section 28 and a second clamping section 30 arranged to each engage with the opposing faces 20 of the conveyor belt 12 in the clamped condition. The first clamping section 28 and a second clamping section 30 are substantially housed by a main body 26 having a top 32, a bottom 34, opposing ends 36a, 36b, and opposing sides 39.

It is noted that in this example the end 36a is provided by a C-section 37 arranged to facilitate a length of RHS (Rectangular Hollow Section) to pass through and be clamped via a bolt (not shown) and nut (not shown) via an aperture 41. This purpose of the RHS is to provide a structural coupling point to enable lifting of the belt 12, via the clamp 10, with a belt lifter (not shown).

In this example, the first clamping section 28 includes a movable clamping member 40 pivotally coupled by a linkage 38 to the bottom 34 of the main body 26. The second clamping section 30 is provided by the top 32 of the main body 26 such that in the clamped condition, the belt 12 is clamped by the first clamping section 28 pivotally elevating toward the top 32 with the first clamping section 28 being moved and the second clamping section 30 being fixed.

The linkage 38 is arranged to maintain a clamping surface 42 of the clamping member 40 generally parallel to the opposing faces 20 of the belt 12 (shown in FIG. 11) and the clamping surface 44 of the second clamping section 30 toward the top 32. This ensures a generally flat contact area between the clamping surfaces 42, 44 and the belt 12. It is noted that in some examples, the clamping surfaces 42, 44 may include surface features such as ribs, teeth, grooves or serrations to increase the friction grip on the belt 12.

In this example, the linkage 38 includes two linkage members 45 that are arranged in a parallel spaced relationship between upper pivots 48 at the clamping member 40 and corresponding lower pivots 50 at the bottom 34. The arrangement the linkage 38 allows the clamping member 40 to be "floating" and increase its clamping force when the belt 12 is relatively tensioned as is further detailed below. Further, importantly, the "floating" of the clamping member 40 allows the force, namely shear force, to be transferred to the clamping member 40 and load sensing section 58 thereby allowing a measurement indicative of the belt tension/load.

As aforesaid, the clamp 10 may be provided as pairs of left-hand and right-hand clamps 10 and an appropriate one of the opposing sides 39 of the main body 26 includes an opening 54 in the form of a slot 56 to allow the opposing edges 14 of the belt 12 to be received between the first clamping section 28 and the second clamping section 30. The main body 26 includes an internal wall 52 that provides an end of travel stop 55 to hold the first clamping section 28, more specifically the movable clamping member 40, in an initial position that is aligned with the slot 56 to allow the opposing edges 14 of the belt 12 to be received and located prior to the first clamping section 28 and the second clamping section 30 being relatively moved to the clamped condition. The initial condition is shown best in FIG. 7.

The clamp 10 may further include a retaining or locking mechanism 51, best shown in FIG. 6, to hold the clamp 10 in the clamped condition. In this example, the retaining mechanism 51 includes a threaded bolt 53 that engages with a knob 57 of one of the linkage members 45. However, other arrangements are possible. It is noted the arrangement of the retaining mechanism 51 holds the linkage members 45 against movement back toward the initial condition. However, the linkage members 45 are not locked from movement further toward the clamped condition and thereby remain able to "float" and responsive to an increase in clamping force.

Turning now to the load sensing arrangement 22 in more detail and referring to FIGS. 7, 8, 9, 11 and 12, the load sensing arrangement 22 includes a load sensing section 58 that has one or more load sensors 59 fitted thereto. The load sensing section 58 is fitted between the clamping member 40 of the first clamping section 28 and an anchor point 17 that is coupled with the anchoring arrangement 16, in use. In this example, the load sensing section 58 has a dog-bone shaped cross section with opposing sides 62, a top face 64, a bottom face 66, opposing ends 69 and a waist 71 between the opposing ends 69. However, in other examples, the load sensing section 58 may have alternative shapes that achieve a similar purpose.

The one or more load sensors 59 are provided in the form of resistive strain gauges 68 fitted to the waist 71 at the top face 64 and the bottom face 66, respectively. However, the one or more load sensors 59 may be placed elsewhere as appropriate. The resistive strain gauges 68 are oriented lengthwise along the load sensing section 58 between the opposing ends 69. It is noted that the load sensing section 58 and the clamping member 40 may be formed as a single part such as being machined from a single piece of metal.

The anchor point 17 is connected to a free end 78 of the load sensing section 58 and is the coupled to a tether 80 of the anchoring arrangement 16. In this example, the anchor point 17 is pivotally coupled to the free end 78 and may be provided in the form of a D-ring, shackle or the like.

Figure 12:
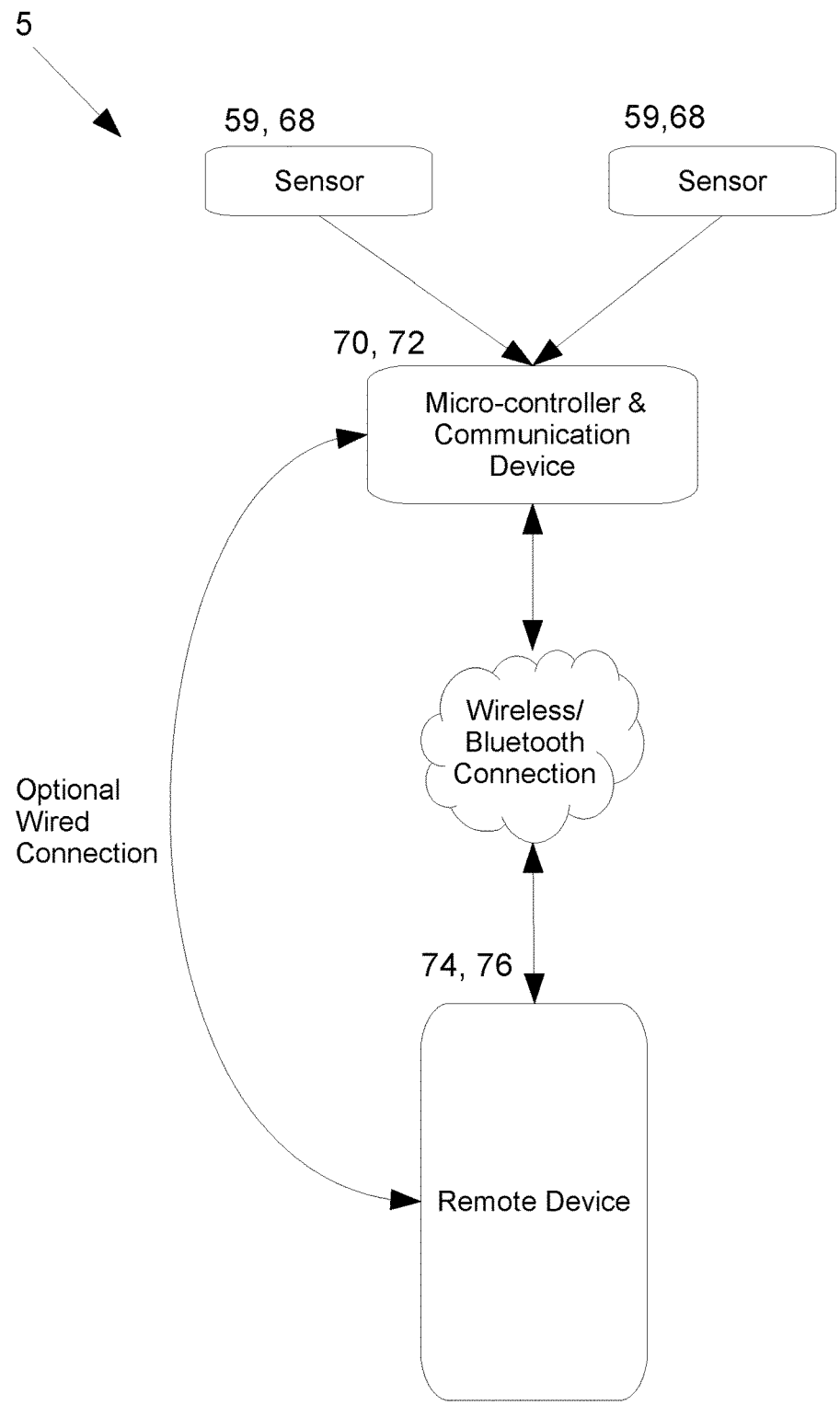
FIG. 12 is a system block diagram illustrating the load sensor arrangement of the belt clamps in communication with an external device.
Figure 13:
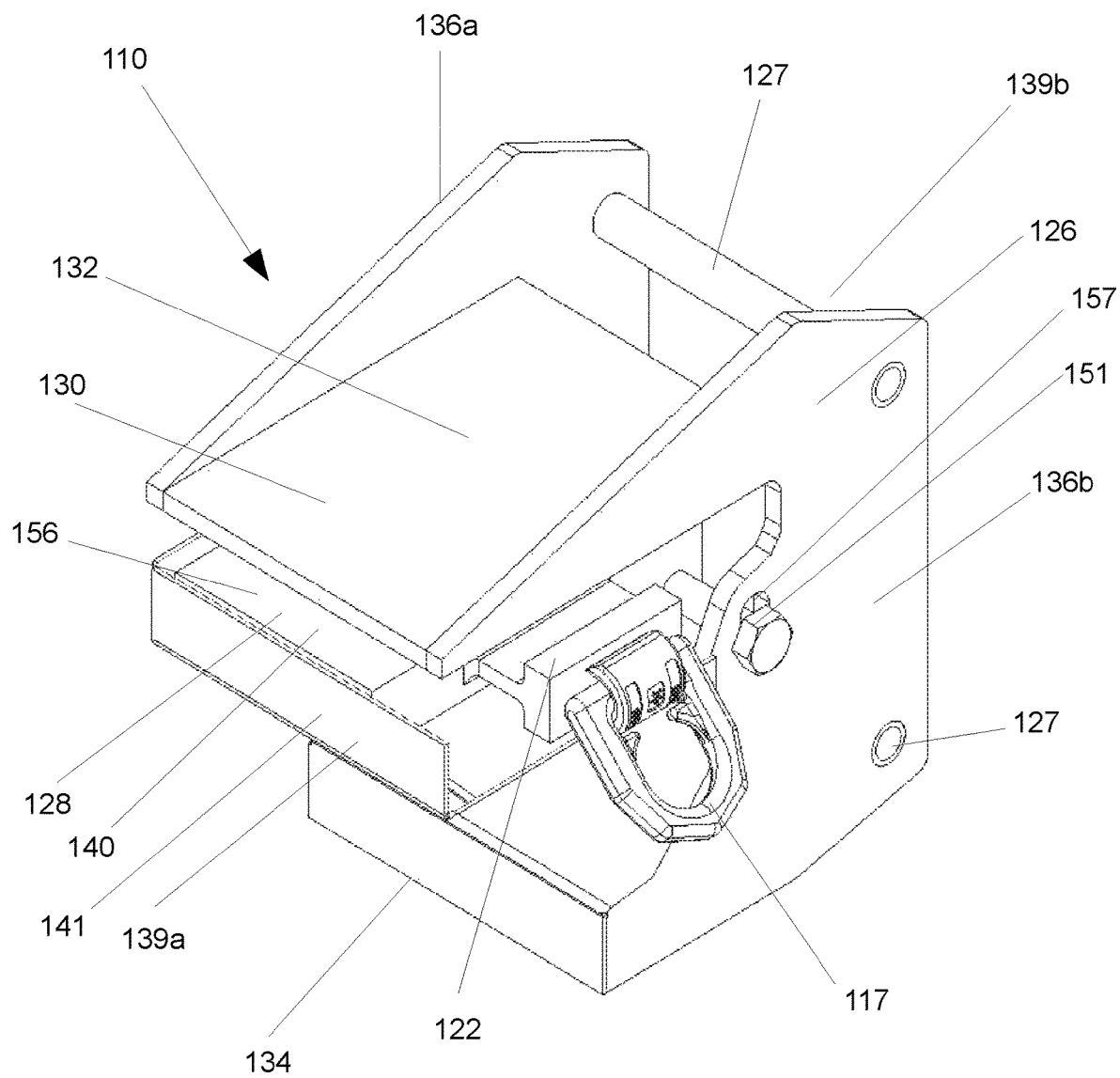
FIG. 13 is a perspective view illustrating a second example of one of a pair of clamps for a conveyor belt.

In this example, the strain gauges 68 are arranged in a half bridge configuration and are wired as two quarter bridges. However, other suitable arrangements may be utilized. Both strain gauges 68 are connected to a communication device 70, as shown in FIG. 12. The communication device 70 may be fitted to the clamp 10 and electrically connected to the strain gauges 68. In other examples, the communication device 70 may be removable or remote to the strain gauges 68.

The communication device 70 may be provided in the form of a microcontroller 72 with a Bluetooth™ chip to allow for wireless communication with Bluetooth™ enabled devices. Such devices may include remote receiving devices 74 such a smart phones or tablets 76. However, other forms of wired and wireless communication and corresponding receiving devices may be utilized.

It is noted that the two quarter bridge strain gauges in conjunction allow measurement of force along the belt line by subtracting the bending element of strain from the total and using that resultant as the horizontal force element. Accordingly, the "tension" in the belt may be determined and monitored.

The determination of the tension may be performed by the microcontroller 72 or at the receiving device 74. In some examples, a predetermined threshold tension value may be set at the microcontroller 72 or at the receiving device 74, and an indication or alert may be provided, such as at the receiving device 74, if the measured tension exceeds the predetermined threshold tension. The predetermined threshold tension may, for example, be set by a user such as via the receiving device 74 for particular situations, sites and types of conveyor belt systems. Simply as an example, the predetermined threshold tension may be in the range of 1,000 kg to 10,000 kg, or other value, as required.

The receiving device 74 may include a screen with an interface to display the tension value or the like. Alternatively, the receiving device 74 may include an audible alert or a flashing light. The receiving device 74 may also be configured to display the current tension and the predetermined threshold tension.

The remote receiving device 74 may also be configured to communicate with a remote server (not shown), such an arrangement, could have, for example, application software operating on the remote receiving devices 74 that is in communication with the remote server. Other configurations may include the remote receiving devices 74 being at or part of a plant control system to provide the current tension and the predetermined threshold tension to a plant operator. Various similar configurations as also possible.

In use, the system 5 is fitted to a conveyor belt 12, such as during maintenance of the belt or rollers, by firstly fitting a pair of edge clamps 10 to the opposing edges 14 of the conveyor belt 12 and relatively moving the respective clamping portions 18 of the pair of edge clamps 10 to engage with opposing side faces 20 of the conveyor belt 12 in the clamped condition. The pair of edge clamps 10 may then be retained in the clamped condition using the retaining mechanism 51. It is noted that the clamps 10 fit the edges 14 of the belt 12 and are therefore able to be used with curved or flat sections of belt.

Tethers 80 of the anchoring arrangement 16 are then coupled to the anchor points 17 at the free ends 78 of each of the load sensing sections 58 of each pair of edge clamps 10. The arrangement is such that the relative tension between the static anchoring arrangement 16 and the belt 12 causes movement of the first clamping section 28, namely the clamping member 40, toward the clamped condition. Once engaged and clamped onto the belt 12 such relative tension is then measurable by the load sensing arrangement 22, namely the load sensors 59 in the form of the resistive strain gauges 68.

The measured load signals are then transmitted via the communication device 70 to the receiving device 74 for viewing or monitoring. As aforesaid, such a receiving device 74 may be configured to provide an alert if the determined tension exceeds a predetermined threshold value. For example, software loaded by a processor of the receiving device 74 may monitor and compare the measured load signal with the predetermined threshold value stored in memory, and then provide an alert such as a light, message or alarm if the determined tension exceeds the predetermined threshold value.

The clamp 10 and parts thereof are substantially formed from metal or other suitable material.

Referring now to FIGS. 13 to 18*b* there is shown a second example of the clamp 110. The second example of the clamp 110 functions in the same way as the above described first example and may be used on the same manner with the system 5. However, in this example some of the geometry and configuration of parts have been altered. Accordingly, all of the parts and functions are not again described here and like sequences of numerals (i.e 10, 110 or 18, 118) are used to denote like or similar parts.

In this example of the clamp 110, like the first example, the clamping portion or arrangement 118 includes a first clamping section 128 and a second clamping section 130 arranged to each engage with the opposing faces 20 of the conveyor belt 12 in the clamped condition, in a similar manner to that described above in relation to the first example. The first clamping section 128 and a second clamping section 130 are substantially housed by a main body 126 having a top 132, a bottom 134, and opposing ends 136*a*, 136*b*, and front and back sides 139*a*, 139*b*.

In this example, the main body 126 has a different construction and shape in comparison to the first example with the opposing ends 136*a*, 136*b* being shaped plates that are interconnected by spaced apart round members 127 located toward the back side 139*a* and are shaped to support the top 132. The round members 127 also serve as handles to allow manual handling.

In this example, like the first example, the first clamping section 128 includes a movable clamping member 140 pivotally coupled by a linkage 138 to the bottom 134 of the main body 126. A cover or plate 141 is provided in this example that at least partially covers a side and bottom the movable clamping member 140 at or toward the front side 139*a*. The cover 141 also may support an underside of the movable clamping member 140 to provide an end of travel stop, and also may serve a safety purpose to reduce or remove pinch points. The cover 141 is shown removed in FIGS. 14*b* and 15*b*. Above the cover 141 and below the second clamping section 130 is defined a slot shaped mouth 156 in which the conveyor belt 12 is initially received before being clamped in the clamped condition.

The second clamping section 130 is provided by the top 132 of the main body 126 such that in the clamped condition, the belt 12 is clamped by the first clamping section 128 pivotally elevating toward the top 132 with the first clamping section 128 being moved and the second clamping section 130 being fixed.

In this example, the linkage 138 includes two linkage members 145 that are arranged in a parallel spaced relationship between upper pivots 148 at the movable clamping member 140 and corresponding lower pivots 150 at the bottom 134. The arrangement the linkage 138 allows the clamping member 140 to be "floating" as with the first example.

Figure 15A:
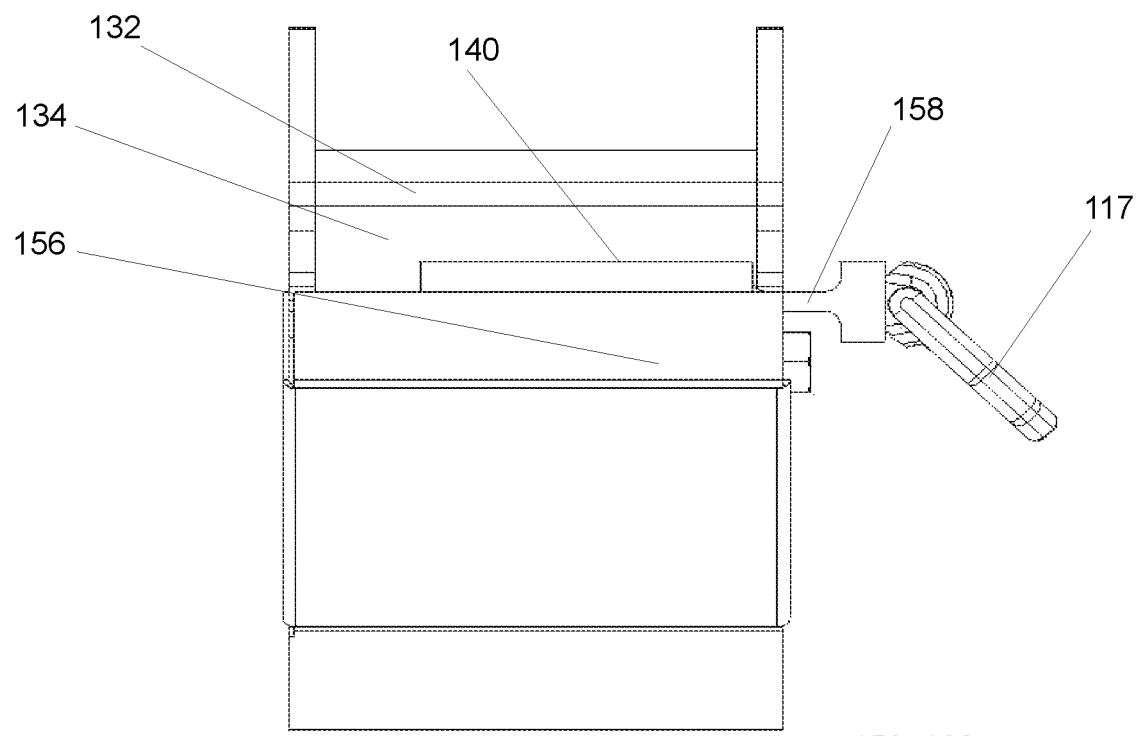
FIG. 15a is a side view illustrating the second example of the clamp with the clamping arrangement moved toward a clamped condition.
Figure 15B:
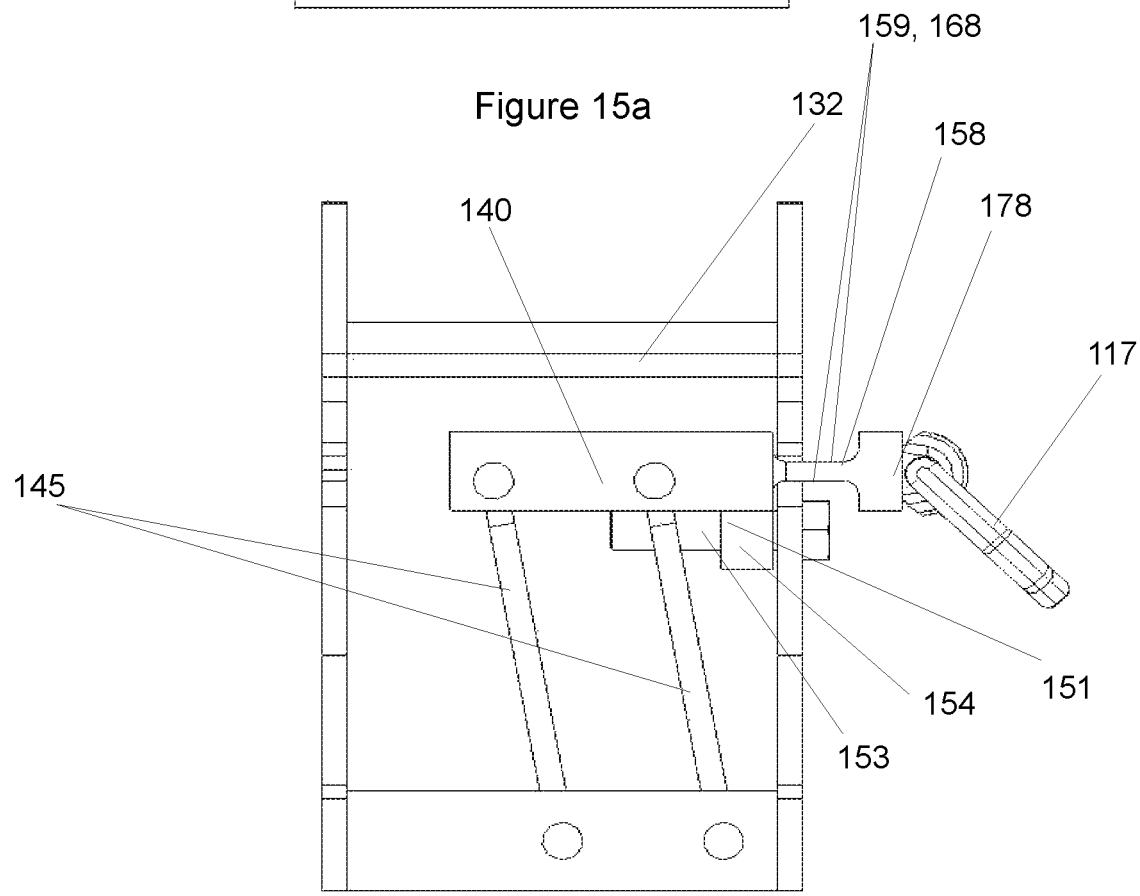
FIG. 15b is a side view illustrating the second example of the clamp with the clamping arrangement moved toward a clamped condition and the cover removed to show the internal configuration.
Figure 16:
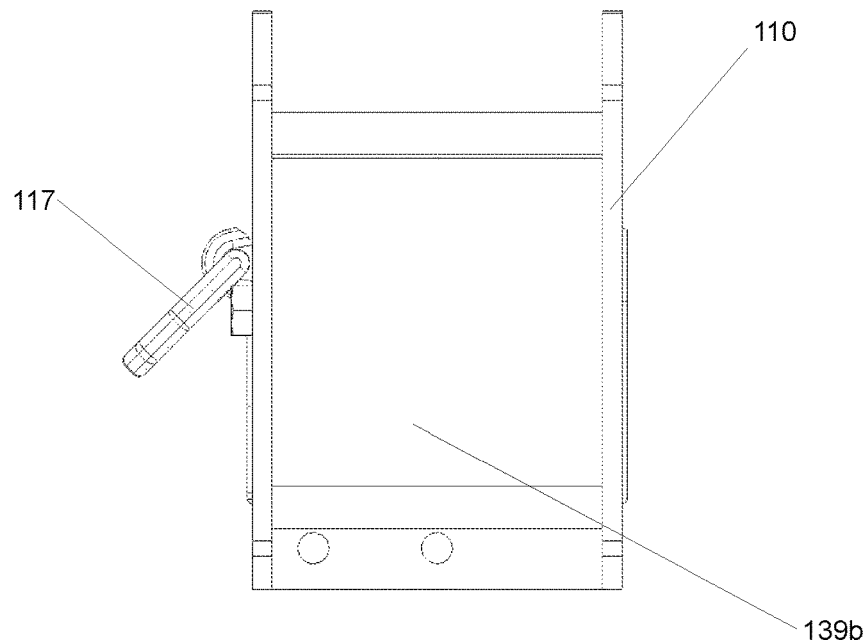
FIG. 16 is an opposing side view the second example of the clamp.
Figure 17A:
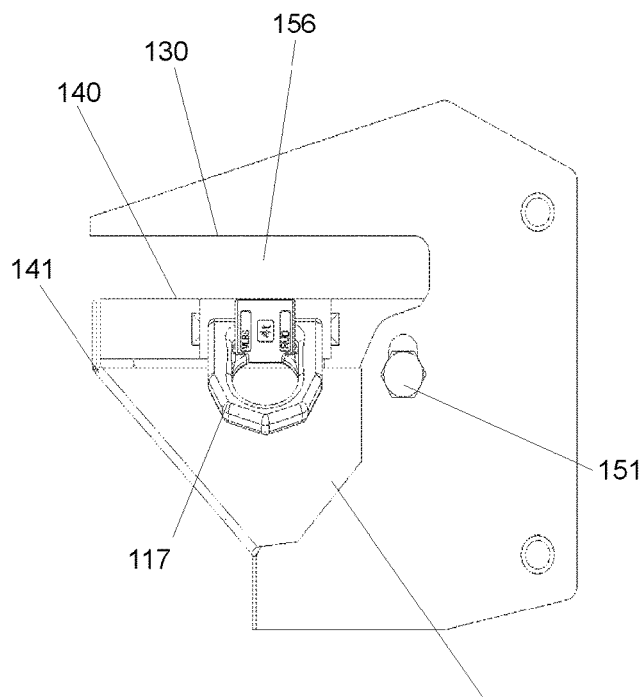
FIG. 17a is a frontend view illustrating the second example of the clamp.
Figure 17B:
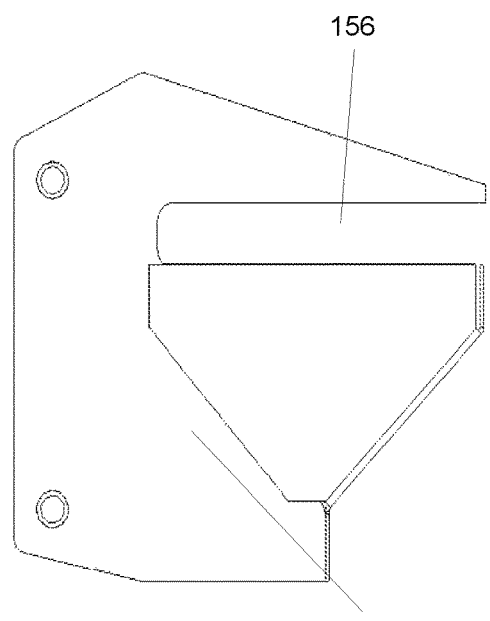
FIG. 17b is a backend view illustrating the second example of the clamp.
Figure 18A:
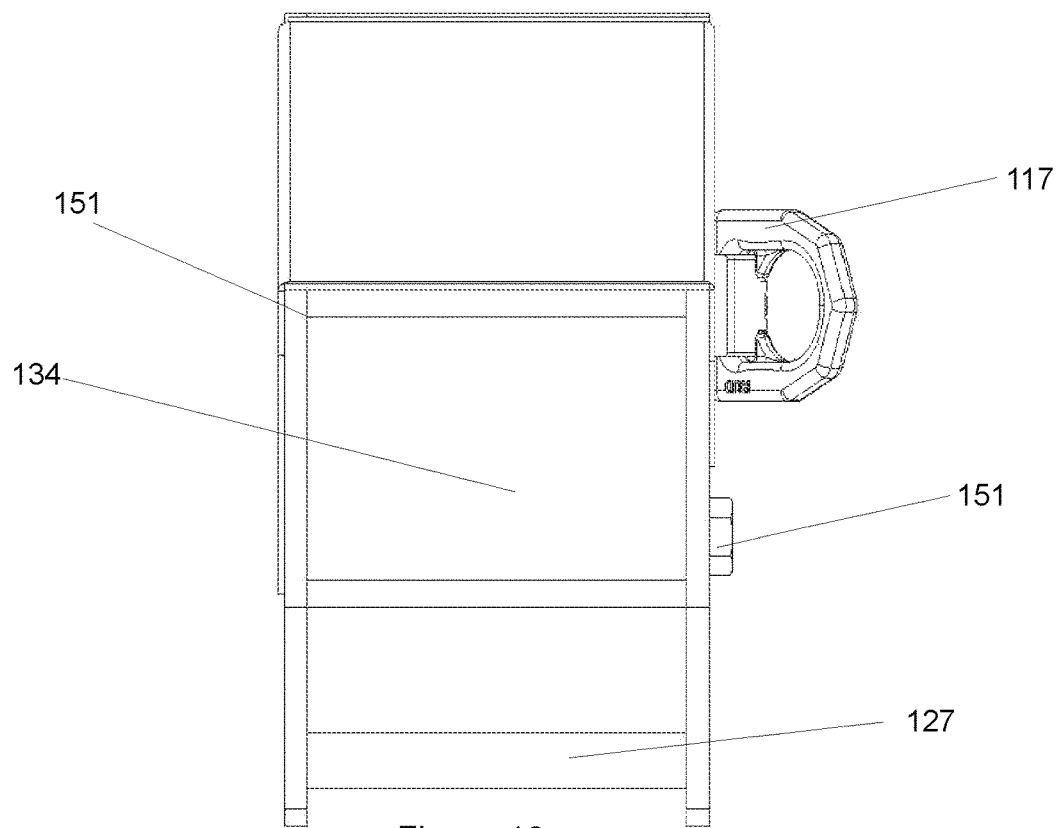
FIG. 18a is a bottom view illustrating the second example of the clamp.
Figure 18B:
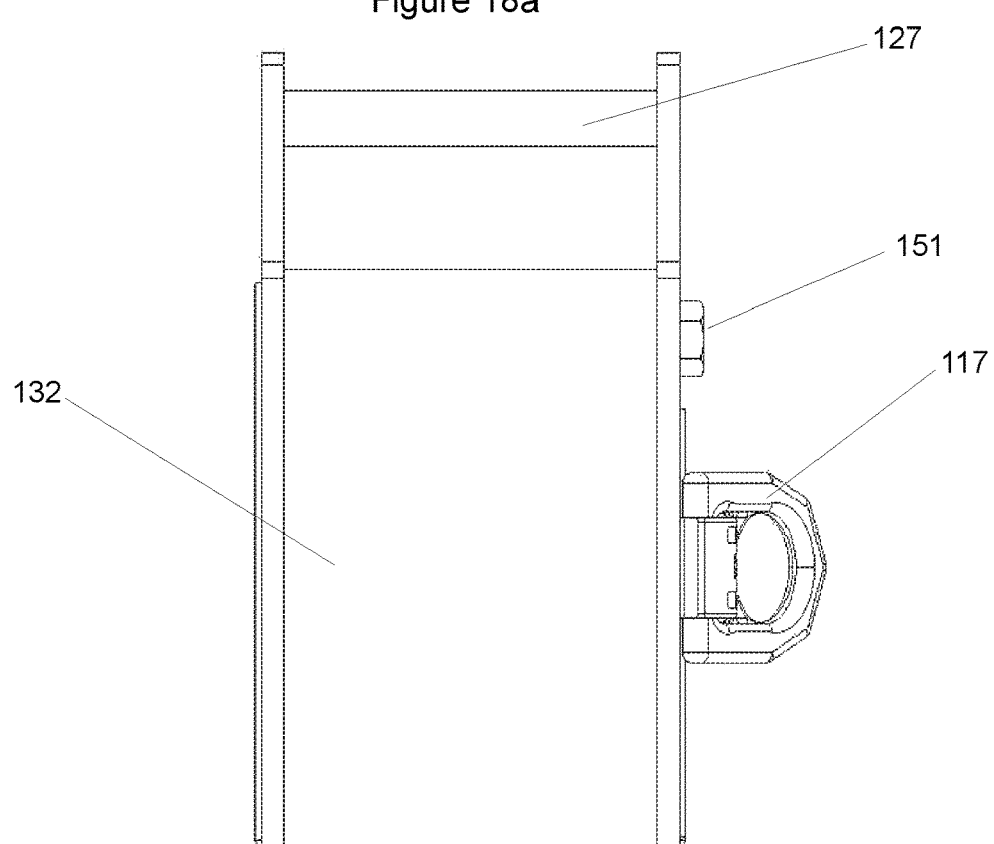
FIG. 18b is a top view illustrating the second example of the clamp.

The clamp 110 may further include a retaining or locking mechanism 151, best shown in FIG. 15*b*, to hold the clamp 110 in the clamped condition. In this example, the retaining mechanism 151 includes a threaded bolt 153 that engages with the movable clamping member 140 or linkage members 145. The bolt 153 is fitted through a vertical elongate aperture 157 that allows some vertical movement of the bolt 154 when not tensioned to allow movement of the clamping member 140 and linkage members 145.

When the bolt 153 is tightened, the retaining mechanism 151 holds the linkage members 145 against movement back toward the initial condition. However, the linkage members 145 are not locked from movement further toward the clamped condition and thereby remain able to "float" and responsive to an increase in clamping force.

Figure 14A:
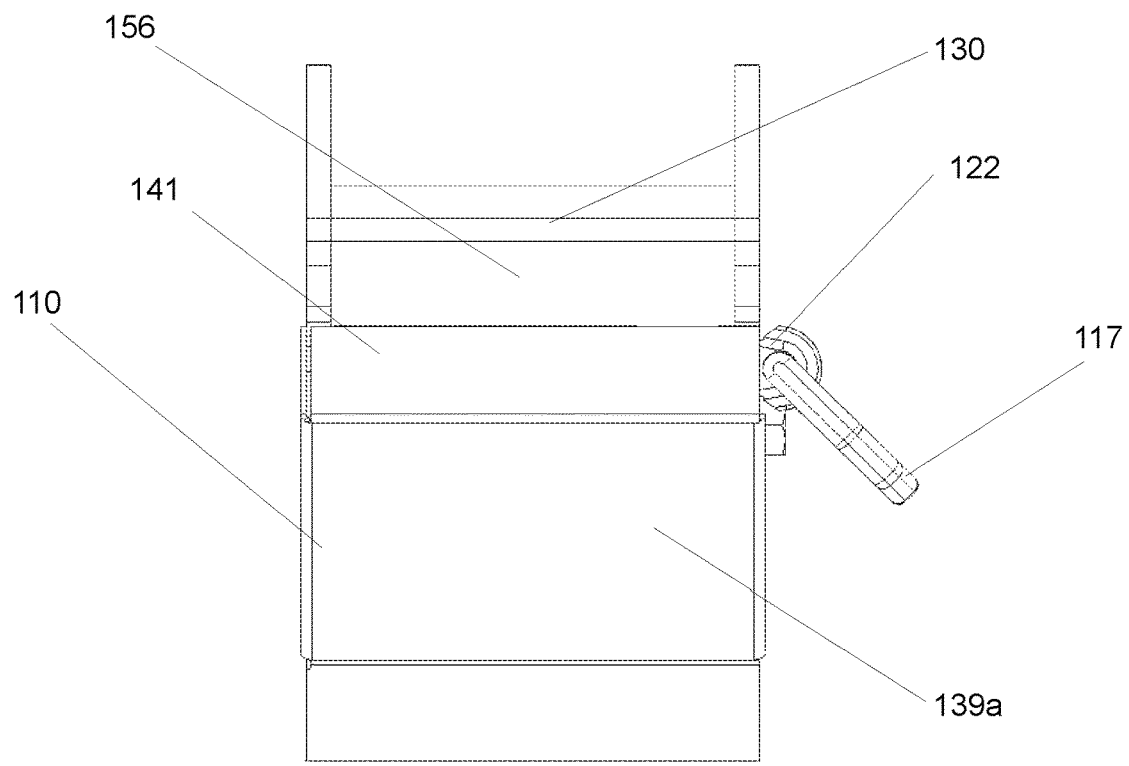
FIG. 14a is a side view illustrating the second example of the clamp.
Figure 14B:
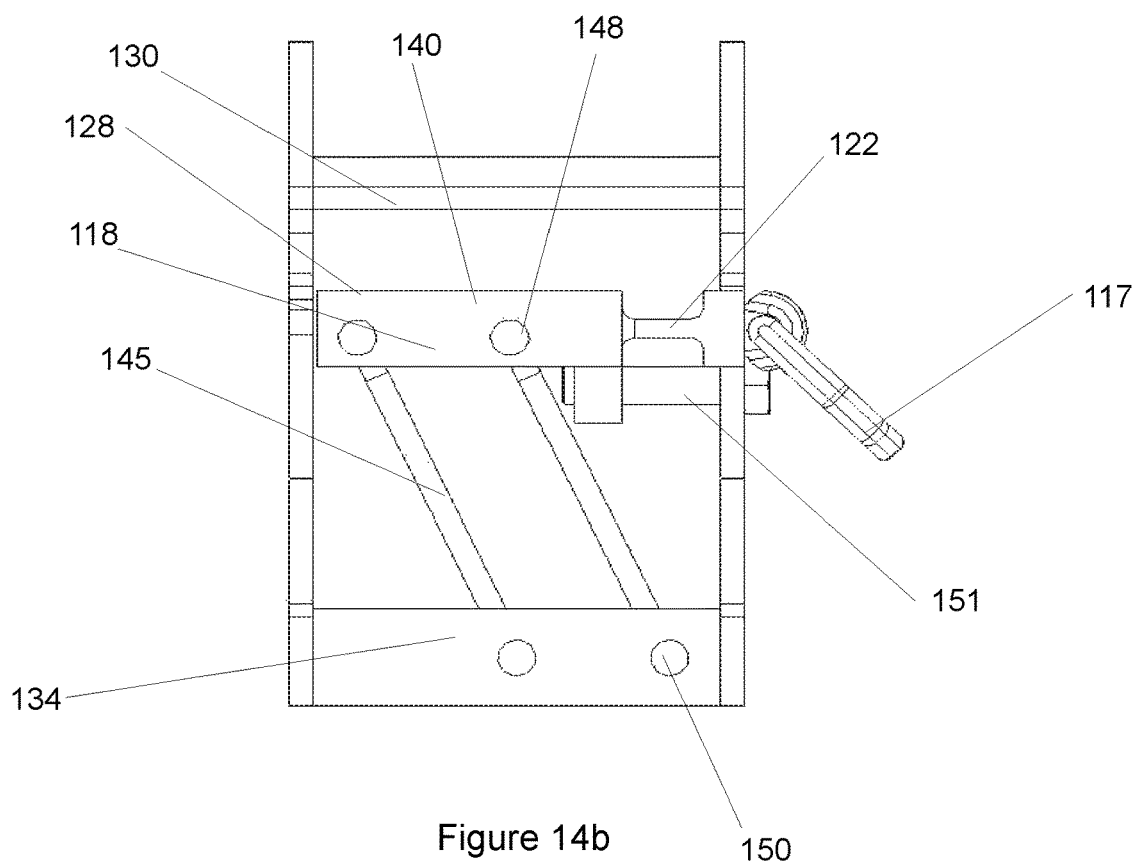
FIG. 14b is a side view illustrating the second example of the clamp with a cover removed to show the internal configuration thereof.

Turning now to the load sensing arrangement 122 in more detail and referring to FIGS. 14*ba* and 15*b*, the load sensing arrangement 122 includes a load sensing section 158 that has one or more load sensors 159 fitted thereto. The load sensing section 158 is fitted between the clamping member 140 of the first clamping section 128 and an anchor point 117 that is coupled with the anchoring arrangement 116, in use.

In this example, the load sensing section 158 has a dog-bone shaped cross section like the first example. However, in other examples, the load sensing section 158 may have alternative shapes that achieve a similar purpose. Like the first example. the one or more load sensors 159 are provided in the form of resistive strain gauges 168 fitted to the load sensing section 158. The anchor point 117 is connected to a free end 178 of the load sensing section 158 and like the first example may be coupled to a tether 180 of the anchoring arrangement 116. In this example, the anchor point 117 is pivotally coupled to the free end 178 and may be provided in the form of a D-ring, shackle or the like.

Like the first example, both strain gauges 168 are connected or associated with a communication device 70, as shown in FIG. 12. The communication device 70 may be fitted to the clamp 110 and electrically connected to the strain gauges 68. In other examples, the communication device 70 may be removable or remote to the strain gauges 168. Accordingly, the second example of the clamp 110 may be interchanged with the first example of the clamp 10 to function in the above described system 5. The remaining functions, such as the tension load alert to a remote device 74, is the same as or similar to the system 5 as above described in relation to the first example, and is not again described here.

Advantageously, there has been described examples of a system including belt edge clamps that allow for the measuring and monitoring of the inline tension of a conveyor belt such as during maintenance. In particular, the pivotally "floating" clamping member of the clamp allows the force from the belt to be responsively transferred to the clamping member and the load sensing section carried thereby. The load sensing section, provided in this example in the shape of a "dog-bone", carries two load sensors in the form of resistive strain gauges that allow measurement of the force along the belt line by subtracting the bending element of strain from the total and using that resultant as the horizontal force element that is indicative of the actual inline belt tension. Most advantageously, the measuring and monitoring of the tension allows an alert to be provided if the measured belt tension exceeds a predetermined threshold.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any known matter or any prior publication is not, and should not be taken to be, an acknowledgment or admission or suggestion that the known matter or prior art publication forms part of the common general knowledge in the field to which this specification relates.

While specific examples of the invention have been described, it will be understood that the invention extends to alternative combinations of the features disclosed or evident from the disclosure provided herein.

Many and various modifications will be apparent to those skilled in the art without departing from the scope of the invention disclosed or evident from the disclosure provided herein.

The claims defining the invention are as follows:

1. A clamp for measuring a tension of a conveyor belt, the clamp including a clamping portion arranged to engage with opposing faces of the conveyor belt in a clamped condition to hold the conveyor belt relative to an anchor, and a load sensing arrangement including at least one sensor between the clamping portion and the anchor, the load sensing arrangement configured to provide a signal indicative of the tension in the conveyor belt in the clamped condition, wherein the clamping portion includes a first clamping section, a second clamping section and a pivotal coupling arranged such that the first clamping section is pivotally moveable relative to the second clamping section to engage with the conveyor belt in the clamped condition.

2. The clamp according to claim 1, wherein the at least one load sensor is arranged to measure at least a load applied in a direction inline with the belt.

3. The clamp according to claim 1, wherein the load sensing arrangement is connected to the first clamping section so as to be moveable therewith.

4. The clamp according to claim 3, wherein the load sensing arrangement includes a load sensing section between the first clamping section and the anchor, and wherein the load sensing section carries the at least one load sensor.

5. The clamp according to claim 4, wherein the load sensing section has a substantially dog-bone shape.

6. The clamp according to claim 4, wherein the at least one load sensor is provided in the form of two strain gauges each located proximate respective opposing upper and lower surfaces of the load sensing section.

7. The clamp according to claim 4, wherein a free end of the load sensing section is coupled with an anchor point that is in turn coupled with the anchor in the clamped condition.

8. The clamp according to claim 1, wherein the second clamping section is substantially fixed.

9. The clamp according to claim 1, wherein the clamp includes a main body with a top and a bottom, the second clamping section being provided toward the top and the first clamping section being pivotally supported by the pivotal coupling arranged between the bottom and the first clamping section.

10. The clamp according to claim 9, wherein the main body includes opposing sides between the top and the bottom, one of the opposing sides having a slot in which an edge of the conveyor belt is receivable.

11. The clamp according to claim 1, wherein the pivotal coupling is arranged to maintain a first clamping surface of the first clamping section substantially parallel to the conveyor belt.

12. The clamp according to claim 1, wherein the pivotal coupling is arranged to allow the first clamping section to increase a clamping force on the belt in response to an increase in tension in the conveyor belt.

13. The clamp according to claim 1, wherein the pivotal coupling includes two parallel members pivotally coupled at spaced apart locations between the bottom and the first clamping section.

14. The clamp according to claim 1, wherein the clamp includes a retainer arranged to maintain the clamp in the clamped condition.

15. The clamp according to claim 1, wherein the load sensing arrangement includes a communication device arranged to communicate a signal indicative of the tension to an external device.

16. The clamp according to claim 1, wherein the clamp is one-of a pair of clamps provided to couple with opposing side edges of a conveyor belt.

17. A system for detecting load in a conveyor belt, the system including:
   a. A pair of edge clamps each having respective clamping portions adapted to clampingly engage with opposing side edges of the conveyor belt in a clamped condition, the respective clamping portions each having a first clamping section, a second clamping section and a pivotal coupling arranged such that the first clamping section is pivotally moveable relative to the second clamping section to engage with the conveyor belt in the clamped condition;

b. An anchoring arrangement arranged to couple with an anchor point of the pair of edge clamps to anchor the pair of edge clamps to a fixed structure;
c. A load sensing arrangement including a load sensing section located between at least one of the respective clamping portions of the pair of edge clamps and the anchoring arrangement, each load sensing section including a load sensor and a communication device arranged to communicate a load signal; and
d. A receiving device configured to receive the load signal so as to provide an indication of a tension in the conveyor belt in the clamped condition.

18. A method for detecting load in a conveyor belt, the method including the steps of:
a. Fitting a pair of edge clamps to opposing edges of the conveyor belt and pivotally moving at least one of the respective clamping portions of the pair of edge clamps to engage with opposing side edges of the conveyor belt in a clamped condition;
b. Coupling an anchoring arrangement to a load sensing section associated with one or both of the clamping portions of each pair of edge clamps;
c. Transmitting, via a communication device associated with load sensors fitted to each load sensing section, a load signal; and
d. Receiving, at a receiving device, the load signal so as to provide an indication of a tension in the conveyor belt in the clamped condition.

19. A clamp for measuring a tension of a conveyor belt, the clamp including a main body and a clamping portion arranged to engage with opposing faces of the conveyor belt in a clamped condition to hold the conveyor belt relative to an anchor, and a load sensing arrangement between the clamping portion and the anchor, the load sensing arrangement configured to provide a signal indicative of the tension in the conveyor belt in the clamped condition, wherein the clamping portion includes a first clamping section and a second clamping section, the first clamping section being pivotally supported by a pivotal coupling between the first clamping member and the main body.

20. A clamp for measuring a tension of a conveyor belt, the clamp including a clamping portion arranged to engage with opposing faces of the conveyor belt in a clamped condition to hold the conveyor belt relative to an anchor, and a load sensing arrangement between the clamping portion and the anchor, the load sensing arrangement configured to provide a signal indicative of the tension in the conveyor belt in the clamped condition, wherein the clamp includes a retainer arranged to maintain the clamp in the clamped condition.

21. A system for detecting load in a conveyor belt, the system including:
a. A pair of edge clamps each having respective clamping portions adapted to clampingly engage with opposing side edges of the conveyor belt in a clamped condition, wherein each of the pair of edge clamps include a retainer to maintain each of the pair of edge clamps in the clamped condition;
b. An anchoring arrangement arranged to couple with an anchor point of the pair of edge clamps to anchor the pair of edge clamps to a fixed structure;
c. A load sensing arrangement including a load sensing section located between at least one of the respective clamping portions of the pair of edge clamps and the anchoring arrangement, each load sensing section including a load sensor and a communication device arranged to communicate a load signal; and
d. A receiving device configured to receive the load signal so as to provide an indication of a tension in the conveyor belt in the clamped condition.

22. A method for detecting load in a conveyor belt, the method including the steps of:
a. Fitting a pair of edge clamps to opposing edges of the conveyor belt and moving at least one of the respective clamping portions of the pair of edge clamps to engage with opposing side edges of the conveyor belt in a clamped condition, and actuating a retainer associated with each of the pair of edge clamps to maintain each of the pair of edge clamps in the clamped condition;
b. Coupling an anchoring arrangement to a load sensing section associated with one or both of the clamping portions of each pair of edge clamps;
c. Transmitting, via a communication device associated with load sensors fitted to each load sensing section, a load signal; and
d. Receiving, at a receiving device, the load signal so as to provide an indication of a tension in the conveyor belt in the clamped condition.

\* \* \* \* \*